United States Patent [19]
Voelzke et al.

[11] Patent Number: 6,144,562
[45] Date of Patent: Nov. 7, 2000

[54] COMPONENT MOUNTING BRACKET SYSTEM

[75] Inventors: Vernon P. Voelzke, Brookings; Jack R. Tolk, Estelline, both of S. Dak.

[73] Assignee: Daktronics, Inc., Brookings, S. Dak.

[21] Appl. No.: 09/167,085

[22] Filed: Oct. 6, 1998

[51] Int. Cl.[7] .................................................. H02B 1/01
[52] U.S. Cl. ........................ 361/825; 361/807; 361/810; 174/52.1
[58] Field of Search .................................. 361/825, 836, 361/807, 809–811; 174/52.1

[56] References Cited

U.S. PATENT DOCUMENTS

| | | |
|---|---|---|
| 1,669,199 | 5/1928 | Hicks . |
| 3,579,044 | 5/1971 | Phillips, Jr. et al. .................. 317/103 |
| 3,702,421 | 11/1972 | Grul . |
| 3,883,682 | 5/1975 | Cagle et al. ............................ 174/68.5 |
| 4,467,399 | 8/1984 | Van Husen ............................... 361/379 |
| 4,991,061 | 2/1991 | Strange . |
| 5,343,365 | 8/1994 | Luene burger ........................... 361/773 |

*Primary Examiner*—Jeffrey Gaffin
*Assistant Examiner*—Tuan Dinh

[57] ABSTRACT

A component mounting bracket system for mounting a component on a mounting wall having a pair of support apertures and a hole. The system comprises an upper bracket and a lower bracket mountable on a component. The upper bracket has a mounting aperture and the lower bracket includes a main portion and a pair of bracket arms attached to the main portion. The bracket arms are positioned in a spaced relationship and have a lower edge with a mounting notch opening downwardly for engaging a lower edge of one of the support apertures. The notches permit a relatively small degree of pivot movement of the lower bracket and the component mounted thereto with respect to the mounting wall while supporting the component in a position substantially adjacent to the mounting wall. The mounting aperture of the upper bracket forms a loop structure for looping over a fastener protruding from the hole in the mounting wall for hanging the component from the fastener.

23 Claims, 3 Drawing Sheets

COMPONENT MOUNTING BRACKET SYSTEM

BACKGROUND OF THE INVENTION

1. Field of the Invention

The present invention relates to a component mounting bracket system and more particularly pertains to a bracket apparatus adapted for mounting a component (such as, for example, an electrical transformer) to a wall in a housing.

2. Description of the Prior Art

Large size display signs are increasingly employed in large venues such as enclosed and open air stadiums and sports fields for displaying information and images to the people in the venue. The display signs are typically mounted high in the air for maximum visibility in these venues, and in the case of the outdoor venues, the signs are often continuously exposed to elements such as wind and moisture for a period of many years.

The display signs are typically formed by a plurality of substantially identical display modules that are assembled together to form a bank of modules. Each of the display modules is equipped with individual electrical circuitry for actuating the module's display device (for example, by illuminating a light bulb or turning a multi-faceted cube) individually of the other display modules in the bank of modules. The various components present in each of the modules can contribute significantly to the weight of the sign, and complicate the initial assembly of the sign. Because of the large number of modules employed in a typical display sign, it is desirable to minimize the weight and complexity of assembly of the parts forming each module. However, the stresses encountered in manufacture, shipping, installation, and operation of the display sign make durability of the modules (and the components therein) a primary concern for manufacturing such signs.

A significant component of a typical display sign module is an electrical coil transformer for converting the voltage of the electricity supplied to each of the individual modules to a voltage useful by the components of the module. The transformer in each module often has a significant weight, especially when higher voltages and power levels are used. Illustratively, a typical transformer can weigh up to 10 to 15 pounds or more, and therefore a strong support structure is required for mounting the transformer in the module. The significant weight of the transformer, and the need to keep the transformer securely mounted in place during the stages of the life of the display sign, makes a strong and secure mounting for the transformer of utmost concern.

Previously, laminated core type transformers, and especially the large transformers employed in large display signs, have been mounted on a mounting wall in these signs by a plurality of individual "L-shaped" brackets each fastened individually and directly to the transformer and to the mounting wall. Mounting the transformer in this manner also required a plurality of fasteners on the transformer and on the mounting wall, and in turn a plurality of fastening operations, at least some of which had to be performed in the confines of the interior of the display sign. Alignment of holes in the transformer, the brackets, and the mounting wall for mounting the fasteners also proved difficult due in part to varying tolerances in the numerous parts to be aligned. Also, the laminated core type transformers have typically been mounted directly against the surface of the mounting wall, thus limiting any cooling air flow therebetweeen.

Further, toroid-shaped transformers have been mounted in modules by a fastener extending through the center of the toroid into the mounting wall. Toroidal transformers of adjacent modules have previously been mounted by a common fastener extending through a common wall located between the modules. However, this approach holds the toroid transformer directly against the mounting wall and limits the air flow about the transformer.

Therefore, a simple and lightweight manner for mounting components in the modules of display signs is highly desirable for manufacturing and transport and durability purposes.

SUMMARY OF THE INVENTION

The present invention, in its broadest sense, comprises a component mounting bracket system for mounting a component on a mounting wall of a housing. In the most preferred applications of the invention, the mounting wall comprises a substantially vertically oriented mounting wall of a housing such that an upper portion of the component when mounted is located generally above a lower portion of the component. The mounting wall with which the invention is most preferably practiced has a pair of support apertures located at substantially the same vertical level and a hole located at a vertical level on the mounting wall above the pair of support apertures.

The component mounting bracket system comprises an upper bracket mountable on the upper portion of the component, with the upper bracket having a mounting aperture for accepting a removable fastener for mounting the upper bracket on the mounting wall. Further, the mounting bracket system comprises a lower bracket mountable on the lower portion of the component. The lower bracket includes a main portion for mounting on the lower portion of the component and a pair of bracket arms attached to the main portion. The bracket arms extend in substantially the same direction away from the main portion for extending away from a component mounted on the main portion. The bracket arms are positioned in a spaced relationship with respect to each other for generally corresponding to the separation between the support apertures in the mounting wall. Each of the bracket arms have a lower edge for orienting in a downward direction when the lower bracket is mounted on the component. Each of the lower edges has a mounting notch opening downwardly for engaging a lower edge of one of the support apertures in the mounting wall. Each of the mounting notches has a width along the lower edge for permitting a relatively small degree of pivot movement of the lower bracket and a component mounted thereto with respect to the mounting wall while supporting the component in a position substantially adjacent to the mounting wall.

Preferably, the mounting aperture of the upper bracket forms a loop structure for looping over a fastener protruding from the hole in the mounting wall for hanging the component from the fastener. The loop structure is adapted to permit upward movement of the upper bracket with respect to the fastener to release the upper bracket from the fastener.

In the most preferred embodiment of the invention, the upper bracket comprises a component mounting portion for mounting on an upper portion of the component, a spacer portion mounted on the component mounting portion in a substantially perpendicular orientation to the component mounting portion, and a wall mounting portion for mounting on the mounting wall. The wall mounting portion extends in a direction substantially perpendicular to the spacer portion and substantially parallel to the component mounting portion, and the mounting aperture of the upper bracket comprises an elongate slot for orienting with a longitudinal axis thereof in a substantially vertical direction. The spacer portion of the upper bracket has a passage therethrough in communication with the elongate slot in the wall mounting portion for permitting a fastener to be moved through the passage and into the elongate slot for securing the upper bracket to the mounting wall.

Most preferably, the distance between the main portion of the lower bracket and the mounting notch in one of the bracket arms is substantially equal to the distance between the component mounting portion and the wall mounting portion of the upper bracket such that the innermost edge of the mounting notch is located in substantially the same plane as the wall mounting portion.

There has thus been outlined, rather broadly, the more important features of the invention in order that the detailed description thereof that follows may be better understood, and in order that the present contribution to the art may be better appreciated. There are additional features and advantages of the invention that will be described in detail hereinafter and shown in the drawings. Further features and details and advantages of the invention will also become evident as this description proceeds.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
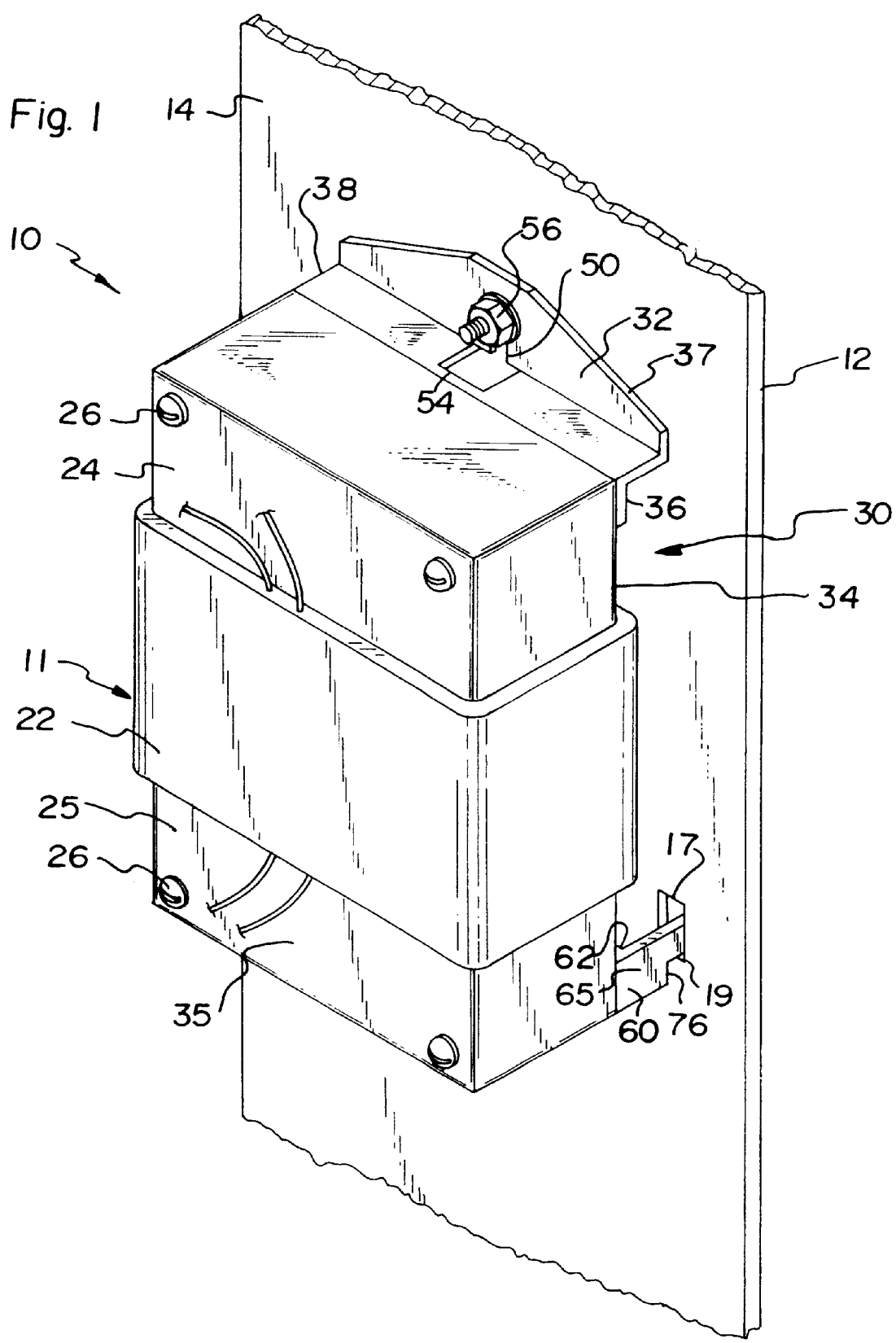
FIG. 1 is a schematic perspective view of the component mounting system of the invention, and particularly illustrates a transformer component mounted using the component mounting system according to the present invention.
Figure 2:
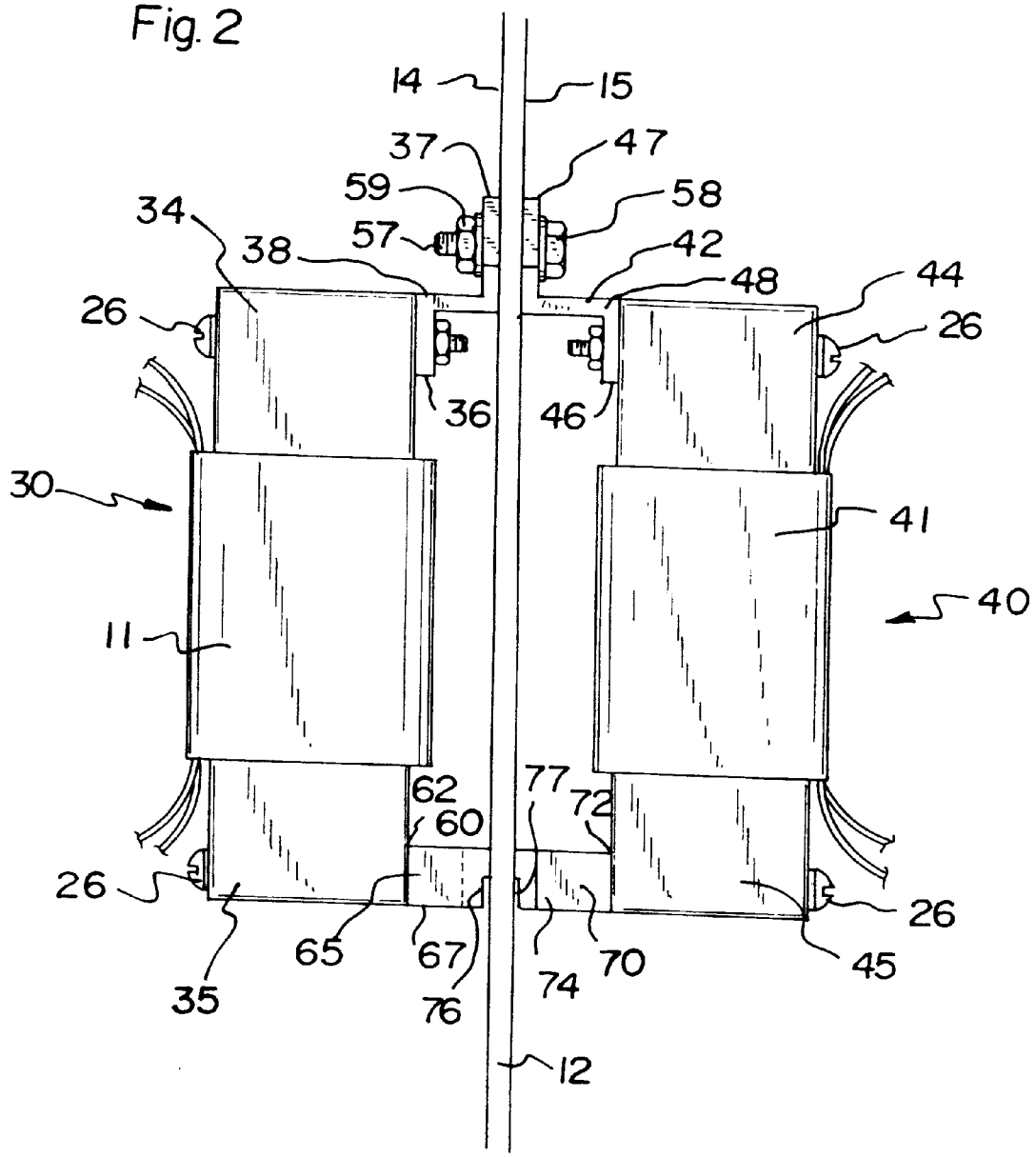
FIG. 2 is a schematic side view of the transformer component mounted using the present invention, and particularly illustrates the capability of the component mounting system of the invention to mount components to a mounting wall on opposite wall surfaces in an opposed relationship.
Figure 3:
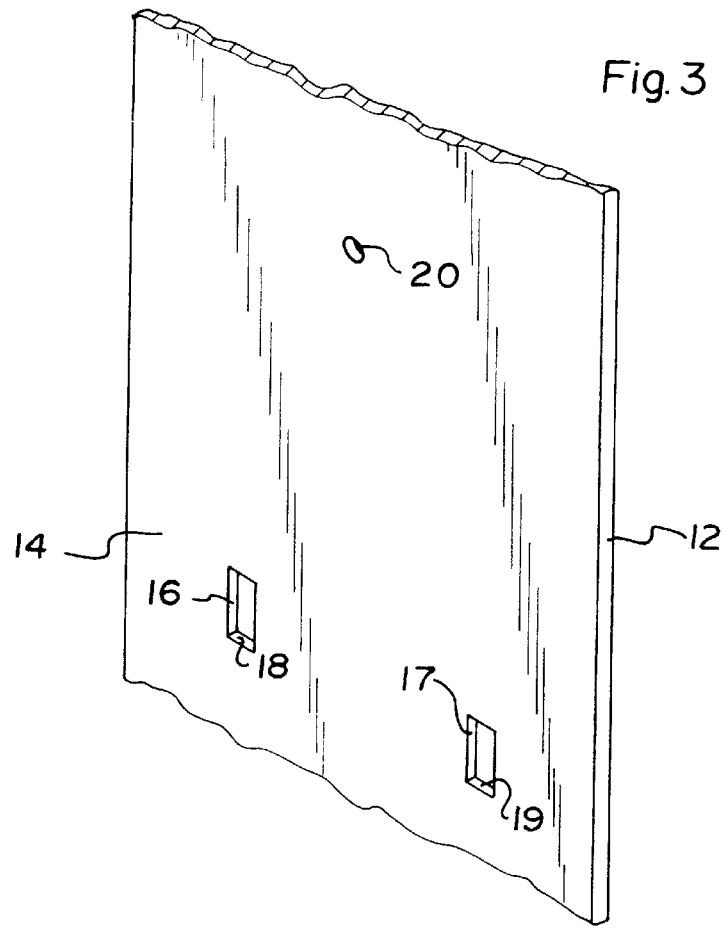
FIG. 3 is a schematic perspective view of a mounting wall configured to have the component mounting system of the invention mounted thereto.
Figure 4:
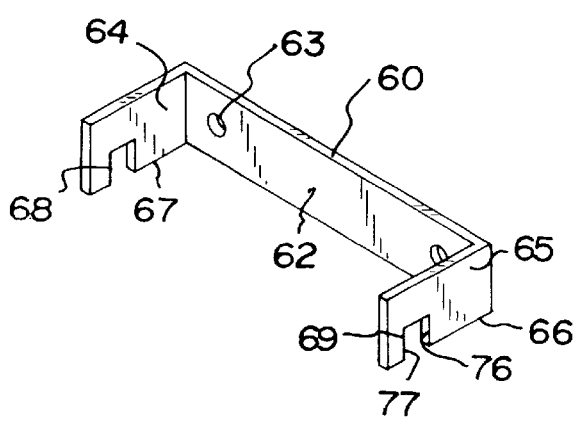
FIG. 4 is a schematic perspective view of a lower bracket of the present invention.
Figure 5:
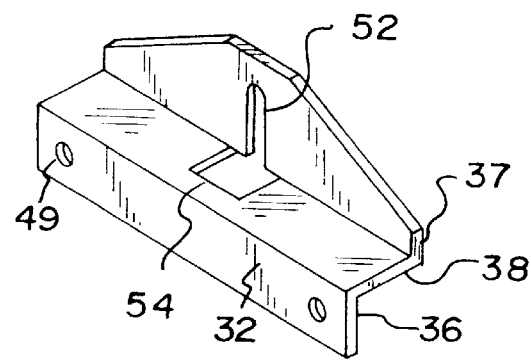
FIG. 5 is a schematic perspective view of an upper bracket of the present invention.

With reference now to the drawings, and in particular to FIGS. 1 through 5 thereof, a component mounting bracket system embodying the principles and concepts of the present invention and generally designated by the reference numeral 10 will be described.

The most preferred embodiment of the invention is most suitably employed on a housing for an electronic display sign comprised of a plurality of individual display modules. The housing often includes one or more mounting walls, with a mounting wall typically separating and forming a part of two adjacent display modules. For the purposes of this description a single mounting wall 12 will be described with the understanding that a typical display sign housing includes a plurality of such mounting walls. A component 11 (and typically a plurality of various components) are mounted in the interior of the module.

A highly suitable mounting wall 12 for the practice of the invention comprises a vertically oriented plate of substantially uniform thickness having first 14 and second 15 opposite surfaces which face the interiors of the adjacent modules.

The mounting wall 12 is provided with a pair of support apertures 16, 17 extending through the mounting wall between the opposite surfaces 14, 15. The support apertures 16, 17 are located at substantially the same vertical level on the mounting wall 12 as each other when the display sign is in its operational orientation. The most preferred support apertures 16, 17 have a substantially rectangular shape, with a lower edge 18, 19 that is substantially straight. Ideally, the support apertures 16, 17 are spaced from each other a distance approximately equal to the horizontal dimension of a component 11 when mounted on the mounting wall 12 for providing the most stable mounting relationship. Illustratively, the apertures 16, 17 are spaced about 3.5 to about 4 inches apart.

As a further feature of the invention, the mounting wall 12 is provided with a hole 20 extending through the mounting wall between the opposite surfaces 14, 15. The hole 20 is located at a vertical level above the pair of support apertures 16, 17 in the mounting wall. Preferably, the hole 20 is spaced about an equal distance from each of the support apertures 16, 17, so the hole is substantially centered at a location above and between the support apertures. The vertical distance between the hole 20 and a line connecting the support apertures 16, 17 is preferably substantially equal to the vertical height of a mounted component 11 (e.g., the distance between the upper and lower portions of the component).

The component mounting bracket system of the invention is employed to mount a component 11 in the interior of the module on the mounting wall 12. The preferred embodiment of the invention is directed to the mounting of an electrical transformer 11 on a mounting wall 12 of a module, although other components (such as, for example, illumination fixtures or other electrical components) may be mounted using the teaching of the invention. The illustrative transformer 11 has a substantially rectangular shape with a transformer body 22 and upper 24 and lower 25 mounting regions at substantially opposite ends of the transformer body 22. The upper 24 and lower 25 mounting regions of the transformer 11 each have mounting holes (not shown) therein which accommodate fasteners 26.

The component mounting bracket system 10 is especially useful for mounting a pair of components to opposite surfaces 14, 15 of a mounting wall 12 in an opposed relationship. The preferred form of the invention utilizes a single set of a hole 20 and pair of support apertures 16, 17 formed in a mounting wall for minimizing the number of holes required in the wall to thereby simplify manufacture and maintain mounting wall strength. A first component assembly 30 is mounted on the mounting wall 12 adjacent to the first surface 14 thereof, and a second component assembly 40 is mounted on the mounting wall adjacent to the second surface 15 thereof.

Each of the first 30 and second 40 component assemblies comprises a component 11, 41; an upper bracket 32, 42; and a lower bracket 60, 70. The component 11, 41 has upper 34, 44 and lower 35, 45 portions, with the upper portion 34, 44 adapted for being located generally above the lower portion 35, 45 when mounted to the substantially vertically oriented mounting wall 12 of the housing. It should be understood that the upper 34, 44 and lower 35, 45 portions are not necessarily separate parts, but are merely areas of the component identified for their positions relative to each other. In the illustrative embodiment, the component 11, 41 is generally elongate and the longitudinal axis of the component is oriented substantially vertically to minimize the horizontal dimension and extent of the component in, for example, the display sign housing.

The upper bracket 32, 42 of the component assembly 30, 40 is mounted to the upper portion 34, 44 of the component 11, 41. The upper bracket 32, 42 comprises a component mounting portion 36, 46 for mounting to the component 11, 41; a wall mounting portion 37, 47 for mounting to the mounting wall 12; and a spacer portion 38, 48 attaching the component mounting portion to the wall mounting portion for spacing the component from the mounting wall. The resulting spacing between the component 11, 41 and the mounting wall 12 permits air flow therebetween, which aids in cooling of the component, especially in the case of a transformer component that typically generates heat.

In the most preferred embodiment of the invention, the upper portion of the substantially rectangular component mounting portion 36, 46 is mounted to an edge of the substantially rectangular spacer portion 38, 48; and the lower edge of the wall mounting portion 37, 47 is mounted to the edge of the spacer portion opposite of the component mounting portion. The preferred wall mounting portion 37, 47 of the upper bracket has a generally frustro-triangular shape. The component mounting portion 36, 46 of the upper bracket 32, 42 is preferably provided with one or more mounting holes 49 that are alignable with one or more mounting holes in the upper mounting region 24 of the transformer 11. This permits fasteners to mount the upper bracket 32, 42 to the upper mounting region 24 of the transformer 11.

Significantly, a mounting aperture 50 is provided in the wall mounting portion 37, 47 of the upper bracket, and the most preferred mounting aperture 50 comprises an elongate slot 52 oriented parallel to an axis extending between the upper and lower brackets, with the axis being generally oriented in a substantially vertical direction parallel to the mounting wall 12 when the component is in mounted position. The spacer portion 38, 48 of the upper bracket has a passage 54 therethrough that is in communication with (and opens into) the elongate slot 52 in the wall mounting portion 37, 47. The passage 54 is preferably substantially rectangular for passing through the head or nut portion of a fastener employed to mount the upper bracket 32, 42 to the mounting wall 12.

The lower bracket 60, 70 of each of the component assemblies 30, 40 is mounted to the lower portion 35, 45 of the component 11, 41 for supporting the lower portion of the component in a position adjacent to, but spaced from, the mounting wall 12. The preferred lower bracket 60, 70 comprises a lower bracket main portion 62, 72 and a pair of bracket arms (indicated by reference numerals 64, 65 on the first lower bracket 60 and reference numeral 74 on the second lower bracket 70) attached to the lower bracket main portion 62, 72. The most preferred main portion 62, 72 has an elongate substantially rectangular shape. The main portion 62, 72 of the lower bracket is preferably provided with one or more mounting holes 63 that are alignable with one or more mounting holes (not shown) in the lower portion of the component 11 for permitting a fastener 26 to mount the lower bracket to, for example, the lower mounting region 25 of the transformer.

The bracket arms 64, 65 are mounted to the main portion 62 of the lower bracket 60 in a spaced relationship with respect to each other with the spacing generally corresponding to the separation between the support apertures 16, 17 of the mounting wall 12 on which the component is to be mounted. Preferably, the spacing between the bracket arms 64, 65 (and therefore the approximate spacing between the support apertures) is approximately equal to the lateral width of the component 11 to enhance the lateral stability of the component assembly in a plane parallel to the mounting wall 12 during mounting of the component assembly 30, 40 on the wall. In the ideal embodiment of the invention, the spacing between the bracket arms 64, 65 is about 3 to 5 inches, although smaller or greater spacings may be employed.

Each of the bracket arms 64, 65 has a lower surface or edge 66, 67 oriented such that it faces in a downward direction from the component 11. A significant feature of the invention is a mounting notch 68, 69 located in the lower edge 66, 67 of each of the bracket arms and opens downwardly when the component is oriented for mounting. The mounting notch 68, 69 is adapted to engage a lower edge 18, 19 of one of the support apertures 16, 17 in the mounting wall 12. The notches 68, 69 in the bracket arms have inner 76 and outer 77 edges. Preferably, the inner edge 76 of the mounting notches 68, 69 and the wall mounting portion 37 of the upper bracket 32 lie in substantially the same plane so that the component 11 is positioned substantially parallel to the mounting wall 12.

The distance between the inner 76 and outer 77 edges defines a width of the mounting notch 68 that extends in a direction along the lower edge 66 of the bracket arm 64, 65. The width of the mounting notch 68 is significant in that a greater width permits a greater degree of pivot movement of the lower bracket 60 (and a component 11 mounted thereto) with respect to the mounting wall 12. Conversely, narrowing the width of the notch 68 limits the degree of pivot movement by the component assembly 30 with regard to the mounting wall 12, and thus prevents the component assembly from pivoting excessively and possibly falling off of the wall 12 prior to completion of the mounting of the component 11 on the wall.

Each of the notches 68, 69 in the lower bracket arms 64, 65 has a width greater than the thickness of the material forming the mounting wall 12 to permit the notch to accept the lower edge 18, 19 of the support aperture 16, 17. Preferably, the width of the notch is at least about 1.2 to 1.6 times the thickness of the mounting wall material for greater ease of mounting the notch 68, 69 on the lower edge 18, 19 of the support aperture and permitting a small degree of pivot movement by the lower bracket 60 and the component 11 mounted thereon. Notch widths of up to about 2 or more times the wall thickness may also be employed for a greater degree of pivot movement and even easier assembly. Preferably, the width of the notches 68, 69 is less than about three times the thickness of the mounting wall material to avoid excessive pivoting of the component assembly 30 and falling away of the component from the mounting wall 12 prior to the upper bracket 32 being fastened to the mounting wall.

To complete the mounting of the component assembly 30 to the mounting wall 12, a mounting fastener 56 is positioned in the mounting hole 20 of the mounting wall for attaching the upper bracket 32 to the mounting wall. The preferred fastener 56 has a shaft portion 57 and a pair of spaced flared portions mounted on the shaft portion. Ideally, the mounting fastener 56 comprises a bolt with a head 58 and a nut 59 mounted on the threads of the shaft portion 57 of the bolt. The shaft portion 57 of the fastener 56 is positioned in the mounting aperture 50 of the upper bracket 32 for hanging and supporting the component assembly 30 on the mounting wall 12. In the ideal embodiment of the invention, the fastener 56 protrudes from both the first 14 and second 15 surfaces of the mounting wall 12 and engages the upper brackets 32, 42 of each of the first 30 and second 40 component assemblies. The fastener 56 is tightened so that one of the flared portions (such as, for example, the bolt head 58) abuts against the wall mounting portion 47 of one of the upper brackets 42 and the other one of the flared portions (such as, for example, the nut 59) abuts against the wall mounting portion 37 of the other of the upper brackets 32 such that the fastener 56 presses the upper brackets 32 and 42 against the respective first 14 and second 15 surfaces of the mounting wall 12.

The elongate slot 52 in the upper bracket 32 preferably has a lateral width that is large enough to permit the shaft portion 57 of the fastener 56 to pass through the slot 52. Also preferably, the width of the elongate slot 52 is small enough to prevent movement of the flared portion of the fastener (e.g., the bolt head 58 or nut 59) through the slot. The passage 54 of the spacer portion 38 has a width large enough to permit the flared portion of the fastener 56 to pass through the passage 54 as the shaft portion 57 of the fastener 56 is moved into the elongate slot 52.

In use, the upper bracket 32 is mounted on an upper portion 34 of the component 11 and the lower bracket 60 is mounted to a lower portion 35 of the component to form a component assembly 30. The mounting notch 68 of one of the bracket arms 64 is positioned or hooked on a lower edge 19 of one of the support apertures 17 in the mounting wall 12. Also, the mounting notch 69 of the other of the bracket arms 65 is positioned on a lower edge 18 on the other of the support apertures 16 of the mounting wall. The upper bracket 32 is fastened to the hole 20 in the mounting wall 12, preferably by raising the upper bracket relative to the hole in the mounting wall and hooking the mounting aperture 52 in the upper bracket on a fastener 56 protruding from the mounting wall. Raising the upper bracket 32 permits the flared portion (such as, for example, the nut 59) of the fastener 56 to be moved through the passage 54 in the spacer portion 38 of the upper bracket while moving the shaft portion 57 of the fastener 56 into the elongate slot 52.

Preferably, a second component assembly 40 is mounted on the mounting wall 12 adjacent to the second surface 15 of the mounting wall. The mounting notch of one of the bracket arms of the second component assembly on a lower edge of one of the support apertures. Similarly, the mounting notch of the other of the bracket arms of the second component assembly is positioned on a lower edge the other of the support apertures. The upper bracket 42 of the second component assembly 40 is fastened to the hole 20 in the mounting wall 12. Significantly, the first 30 and second 40 component assemblies may be initially mounted on the mounting wall 12 by positioning the notches of the respective bracket arms on the lower edges of the support apertures so that the component assemblies are solely supported by the lower bracket at a slightly canted or angled position away from the surfaces of the mounting wall. A fastener 56 is placed in the hole 20 in the mounting wall, and the upper brackets of the component assemblies are pivoted upwardly toward the mounting wall and the mounting aperture 52 in the upper bracket 32, 42 of each of the assemblies 30, 40 is hooked or placed over the end portions of the fastener and between the flared portions of the fastener. Significantly, the mounting fastener 56 may be mounted to the hole 20 in the mounting wall 12 before any portion of the component assembly is mounted or otherwise attached to the wall.

It will be appreciated that various aspects of the invention may be applied to mounting walls having a vertically slanted or even substantially horizontal orientation, although a substantially vertical mounting wall is highly preferred for the assistance that gravity provides for maintaining the component mounting brackets in a proper position on the mounting wall and the holes therein. In those applications, the "upper" bracket 32 is mounted to a first portion of the component and the "lower" bracket 33 is mounted to a second portion of the component, with the first and second portions being positionable at various (or even the same) vertical levels with respect to each other.

The bracket system of the invention provides a advantageous mounting system for components that minimizes the number of fasteners used in mounting the component, thereby simplifying the component mounting operation and reducing the assembled weight. Further, the lower bracket provides a positive interlocking relationship with the mounting wall to resist gravitational force. Also, the necessity of aligning a plurality of holes in view of differing tolerances is minimized.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art in view of this teaching, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A component mounting bracket system for mounting a component on a mounting wall of a housing such that a first portion of said component is located generally above a second portion of said component, said mounting wall having a pair of spaced support apertures positioned for locating adjacent to the second portion of said component and a hole positioned for locating adjacent to the first portion of said component, said component mounting bracket system comprising:

an upper bracket mountable on the first portion of said component, said upper bracket having a mounting aperture for accepting a fastener for removably mounting said upper bracket on said mounting wall; and a lower bracket mountable on the second portion of said component, said lower bracket comprising a main portion for mounting on the lower portion of said component and a pair of bracket arms attached to said main portion, the main portion of said lower bracket lying generally in a first plane, each of said bracket arms lying in a plane oriented substantially perpendicular to the first plane of the main portion, the pair of bracket arms extending in substantially the same direction away from said main portion for extending said bracket arms away from a component mounted on said main portion, said bracket arms being positioned in a spaced and substantially parallel relationship with respect to each other for facilitating insertion of said bracket arms into said spaced support apertures in said mounting wall, each of said bracket arms having a lower surface for orienting in a downward direction when said lower bracket is mounted on said component, each of said lower surfaces having a mounting notch opening downwardly for engaging a lower edge of one of the support apertures in said mounting wall, wherein a pivot axis extends through both of the mounting notches, the pivot axis being oriented substantially parallel to the first plane of said main portion of said lower bracket, each of said mounting notches having a width along said lower surface of said bracket arm for permitting a degree of pivot movement of said lower bracket and a component mounted thereto with respect to said mounting wall while supporting said component in a position substantially adjacent to said mounting wall.

2. The component mounting bracket system of claim 1 wherein the mounting aperture of said upper bracket forms a loop structure for looping over a fastener protruding from the hole in said mounting wall for hanging said component from said fastener, said loop structure being adapted to permit upward movement of said upper bracket with respect to said fastener to release said upper bracket from said fastener.

3. The component bracket mounting system of claim 1 wherein said upper bracket comprises a component mounting portion for mounting on the first portion of said component, a spacer portion mounted on said component mounting portion in a substantially perpendicular orientation to said component mounting portion, and a wall mounting portion for mounting on said mounting wall, and wherein said wall mounting portion extends in a direction substantially perpendicular to said spacer portion and substantially parallel to said component mounting portion, wherein the mounting aperture of said upper bracket comprises an elongate slot for orienting with a longitudinal axis thereof in a substantially vertical direction, the spacer portion of said upper bracket having a passage therethrough in communication with said elongate slot in said wall mounting portion for permitting a fastener to be moved through said passage and into said elongate slot for securing said upper bracket to said mounting wall.

4. The component bracket mounting system of claim 1 wherein said upper bracket comprises a component mounting portion for mounting on the first portion of said component, a spacer portion mounted on said component mounting portion in a substantially perpendicular orientation to said component mounting portion, and a wall mounting portion for mounting on said mounting wall, and wherein the distance between the main portion of said lower bracket and the mounting notch in one of said bracket arms is substantially equal to the distance between said component mounting portion and said wall mounting portion of said upper bracket.

5. The component bracket mounting system of claim 1 wherein said bracket arms are mounted to opposite ends of the main portion of said lower bracket, wherein each of the mounting notches has a generally U shape that opens into the lower surface of the bracket arm for accepting a portion of the mounting wall adjacent to the lower edge of said mounting aperture.

6. A component assembly for mounting on a substantially vertically oriented mounting wall having a pair of support apertures located at substantially the same vertical level and a hole located at a vertical level above the pair of support apertures, said component assembly comprising:

a component having upper and lower portions, said upper portion being for locating generally above said lower portion when said component is mounted on a mounting wall;

an upper bracket for mounting on the upper portion of said component, said upper bracket comprising a component mounting portion mounted to said component, a wall mounting portion for mounting to said mounting wall, and a spacer portion attaching said component mounting portion to said wall mounting portion for spacing said component from a mounting wall, said wall mounting portion having an elongate slot oriented parallel to a longitudinal axis of said component for orienting in a substantially vertical direction, the spacer portion of said upper bracket having a passage therethrough in communication with said elongate slot in said wall mounting portion for permitting a fastener to be moved through said passage and into said elongate slot for securing said upper bracket to said mounting wall; and a lower bracket mounted on the lower portion of said component, said lower bracket comprising a main portion for mounting on the lower portion of said component and a pair of bracket arms attached to said main portion, the main portion of said lower bracket lying generally in a first plane, each of said bracket arms lying in a plane oriented substantially perpendicular to the first plane of the main portion, the pair of bracket arms extending in substantially the same direction away from said main portion for extending said bracket arms away from a component mounted on said main portion, said bracket arms being positioned in a spaced and substantially parallel relationship with respect to each other for facilitating insertion of said bracket arms in said spaced support apertures in said mounting wall, each of said bracket arms having a lower surface for orienting in a downward direction when said lower bracket is mounted on said component, each of said lower surfaces having a mounting notch opening downwardly for engaging a lower edge of one of the support apertures in said mounting wall, wherein a pivot axis extends through both of the mounting notches, the pivot axis being oriented substantially parallel to the first plane of said main portion of said lower bracket, each of said mounting notches having a width along said lower surface for permitting a degree of pivot movement of said lower bracket and a component mounted thereto with respect to said mounting wall while supporting said component in a position substantially adjacent to said mounting wall.

7. The component assembly of claim 6 additionally comprising a fastener for extending into the hole in the mounting wall, said fastener having a shaft portion and a pair of spaced flared portions mounted on said shaft portion, wherein said elongated slot comprises a substantially U-shaped slot of a width large enough to pass the shaft portion of a fastener therethrough but small enough to prevent passage of the flared portion of said fastener, the passage of said spacer portion being of a width large enough to permit passage of the flared portion of said fastener while said shaft portion moves into said U-shaped slot.

8. The component assembly of claim 6 wherein the distance between the main portion of said lower bracket and the mounting notch in one of said bracket arms is substantially equal to the distance between the component mounting portion and the wall mounting portion of said upper bracket.

9. The component assembly of claim 6 wherein the notches in said bracket arms have inner and outer edges, wherein the upper bracket has a wall mounting portion for mounting to said mounting wall, and wherein said inner edges of said bracket arms lie in substantially the same plane as the wall mounting portion of the upper bracket.

10. The component assembly of claim 6 wherein said component comprises a transformer.

11. The component assembly of claim 10 wherein said transformer comprises a transformer body and upper and lower mounting regions at substantially opposite ends of the transformer body, said upper and lower mounting regions each having mounting holes therein, and wherein the main portion of said lower bracket has a mounting hole aligned with one of said mounting holes in said lower bracket for permitting a fastener to mount said upper bracket to the upper mounting region of the transformer, and wherein the component mounting portion of said upper bracket has a mounting hole aligned with one of said mounting holes in said lower bracket for permitting a fastener to mount said upper bracket to the upper mounting region of the transformer.

12. The component assembly of claim 6 wherein the notches in said bracket arms have inner and outer edges, wherein the upper bracket has a wall mounting portion for mounting to said mounting wall, and wherein said inner edges lie in substantially the same plane as the wall mounting portion of the upper bracket.

13. The component assembly of claim 6 wherein said component has a lateral width perpendicular to an axis connecting said upper and lower brackets, and wherein the spacing between the brackets arms of said lower bracket is substantially equal to the lateral width of said component.

14. The component assembly of claim 6 wherein said component has a substantially centrally located longitudinal axis oriented in a substantially vertical direction, and wherein the main portion of said lower bracket is mounted to said component in a position offset from the substantially centrally located longitudinal axis such that the spacing of one of said bracket arms is different from the spacing of the other of said bracket arms from said centrally located longitudinal axis to permit mounting of a pair of component assemblies on opposite sides of said mounting wall using the same support apertures and hole in the mounting wall.

15. The component assembly of claim 6 wherein said component comprises a component body and a pair of mounting regions at substantially opposite ends of said component body, one of said mounting regions forming an upper mounting region mounted on the upper portion of said component and the other of said mounting regions forming a lower mounting region mounted on the lower portion of said component, said upper bracket being mounted on the upper mounting region of said component, said lower bracket being mounted on the lower mounting region of said component.

16. A display sign housing comprising:

a substantially vertically oriented mounting wall, said mounting wall having first and second opposite surfaces, said mounting wall having a pair of support apertures extending through said mounting wall and being located at substantially the same vertical level on said mounting wall, said mounting wall having a hole extending through said mounting wall at a vertical level above said pair of support apertures;

first and second component assemblies, said first component assembly being mounted on said mounting wall adjacent the first surface thereof, said second component assembly being mounted on said mounting wall adjacent the second surface thereof, said first and second component assemblies each comprising:

a component having upper and lower portions, said upper portion being for locating generally above said lower portion when said component is mounted on a mounting wall;

an upper bracket mounted to the upper portion of said component, said upper bracket comprising a component mounting portion mounted to said component, a wall mounting portion for mounting to said mounting wall, and a spacer portion attaching said component mounting portion to said wall mounting portion for spacing said component from a mounting wall, said wall mounting portion having an elongate slot oriented parallel to a longitudinal axis of said component for orienting in a substantially vertical direction, the spacer portion of said upper bracket having a passage therethrough in communication with said elongate slot in said wall mounting portion; and a lower bracket mounted to the lower portion of said component, said lower bracket having a lower bracket main portion and a pair of bracket arms attached to said lower bracket main portion, said bracket arms being mounted to said lower bracket main portion in a spaced relationship generally corresponding to the separation between the support apertures of said mounting wall, the main portion of said lower bracket lying generally in a first plane, each of said bracket arms lying in a plane oriented substantially perpendicular to the first plane of the main portion, each of said bracket arms having a lower surface oriented in a downward direction, said lower surfaces each having a mounting notch therein engaging a lower edge of one of said support apertures in said mounting wall, each of said mounting notches having a width along said lower surface for permitting a relatively small degree of pivot movement of said lower bracket and a component mounted thereto with respect to said mounting wall while supporting said component in a position substantially adjacent to said mounting wall, wherein a pivot axis extends through both of the mounting notches, the pivot axis being oriented substantially parallel to the first plane of said main portion of said lower bracket; and a fastener extending into the mounting hole in said mounting wall, said fastener having a shaft portion and a pair of spaced flared portions mounted on said shaft portion, the shaft portion of said fastener passing through the mounting aperture of said upper bracket of each of said first and second component assemblies, one of said flared portions abutting against the wall mounting portion of one of said upper brackets and the other one of said flared portions abutting against the wall mounting portion of the other of said upper brackets such that said fastener presses said upper brackets against the respective first and second surfaces of said mounting wall;

wherein said elongate slot in said upper bracket has a width large enough to pass the shaft portion of said fastener therethrough and small enough to prevent passage of the flared portion of said fastener, the passage of said spacer portion having a width large enough to permit a flared portion of a fastener to pass through said passage as the shaft portion of said fastener moves into said elongate slots;

wherein the mounting notch of a first one of said bracket arms of said first component assembly is positioned on the lower edge of one of said support apertures adjacent a first one of the bracket arms of the lower bracket of the second component assembly, and the mounting notch of a second one of said bracket arms of said first component assembly is positioned on the lower edge of the other of said support apertures adjacent a second one of the bracket arms of the lower bracket of the second component assembly.

17. The display sign housing of claim 16 wherein the notches in said bracket arms have inner and outer edges, wherein the wall mounting portion of said upper bracket and the inner edges lie in substantially the same plane.

18. The display sign housing of claim 16 wherein each of said notches in said lower brackets has a width greater than the thickness of said mounting wall to permit said lower bracket to pivot with respect to said mounting wall, and wherein each of said notches has a width less than about three times the thickness of said mounting wall to limit the degree of pivot movement by said component away from the surface of said mounting wall.

19. A method of mounting a component to a substantially vertically oriented mounting wall of a housing having opposite sides and a pair of support apertures located at substantially the same vertical level and a hole located at a vertical level on said mounting wall above said pair of support apertures, the support apertures and the hole extending from a first one of said sides of the mounting wall to a second one of said sides of said mounting wall, said method comprising:

providing an upper bracket having a mounting aperture, and providing a lower bracket having a pair of bracket arms, said bracket arms being positioned in a spaced relationship with respect to each other for generally corresponding to the separation between said support apertures in said mounting wall, each of said bracket arms having a lower surface with a mounting notch opening downwardly, wherein a pivot axis extends through both of the mounting notches;

mounting said upper bracket on an upper portion of a component and mounting said lower bracket to a lower portion of said component to form a first component assembly;

supporting the first component assembly adjacent to the first side of the mounting wall by positioning the mounting notch of a first one of said bracket arms on a lower edge of one of said support apertures and positioning the mounting notch of a second one of said bracket arms on a lower edge the other of said support apertures;

d) fastening the upper bracket to the hole in the mounting wall.

20. The method of claim 19 additionally comprising the steps of providing a second component assembly, supporting the second component assembly adjacent to the second side of the mounting wall by positioning the mounting notch of a first one of said bracket arms of the second component assembly on a lower edge of one of said support apertures adjacent the first bracket arm of the lower bracket of the first component assembly, and positioning the mounting notch of a second one of said bracket arms of said second component assembly on a lower edge the other of said support apertures adjacent the second bracket arm of the lower bracket of the first component assembly, and fastening the upper bracket of the second component assembly to the hole in the mounting wall.

21. A component mounting bracket system for mounting a component on a mounting wall of a housing such that a first portion of said component is located generally above a second portion of said component, said mounting wall having a pair of spaced support apertures positioned for locating adjacent to the second portion of said component and a hole positioned for locating adjacent to the first portion of said component, said component mounting bracket system comprising:

an upper bracket mountable on the first portion of said component, said upper bracket having a mounting aperture for accepting a fastener for removably mounting said upper bracket on said mounting wall; and a lower bracket mountable on the second portion of said component, said lower bracket comprising a main portion for mounting on the lower portion of said component and a pair of bracket arms attached to said main portion, said bracket arms being positioned in a spaced and substantially parallel relationship with respect to each other for facilitating insertion of said bracket arms into said spaced support apertures in said mounting wall, each of said bracket arms having a lower surface for orienting in a downward direction when said lower bracket is mounted on said component, each of said lower surfaces having a mounting notch opening downwardly for engaging a lower edge of one of the support apertures in said mounting wall, wherein a pivot axis extends through both of the mounting notches, the pivot axis being oriented substantially parallel to said main portion of said lower bracket.

22. The system of claim 21 wherein the main portion of said lower bracket lies generally in a first plane, and each of said bracket arms lie in a plane oriented substantially perpendicular to the first plane of the main portion.

23. The system of claim 21 wherein each of said mounting notches has a width along said lower surface of said bracket arm adapted for permitting a degree of pivot movement of said lower bracket and a component mounted thereto with respect to said mounting wall while supporting said component in a position substantially adjacent to said mounting wall.

* * * * *